United States Patent
Glaesener et al.

(10) Patent No.: US 7,461,976 B2
(45) Date of Patent: Dec. 9, 2008

(54) FLEXIBLE SHOE ASSEMBLY

(75) Inventors: Pierre Glaesener, Bissen (LU); Harald Kollmeier, Parette (BE)

(73) Assignee: Husky Injection Molding Systems Ltd. (CA)

( * ) Notice: Subject to any disclaimer, the term of this patent is extended or adjusted under 35 U.S.C. 154(b) by 836 days.

(21) Appl. No.: 09/835,439

(22) Filed: Apr. 17, 2001

(65) Prior Publication Data

US 2002/0022068 A1    Feb. 21, 2002

Related U.S. Application Data

(62) Division of application No. 09/448,477, filed on Nov. 24, 1999, now Pat. No. 6,290,482.

(51) Int. Cl.
*F16C 27/02*    (2006.01)
*F16C 29/00*    (2006.01)

(52) U.S. Cl. ............... 384/37; 384/38; 384/40

(58) Field of Classification Search ......... 384/37, 384/38, 40, 57, 103, 105, 124, 192, 202, 384/215, 2, 42

See application file for complete search history.

(56) References Cited

U.S. PATENT DOCUMENTS

| | | | | |
|---|---|---|---|---|
| 1,991,461 A | * | 2/1935 | Howarth | 384/306 |
| 2,424,028 A | * | 7/1947 | Haeberlein | 384/223 |
| 3,604,765 A | * | 9/1971 | Babcock | 384/192 |
| 3,719,404 A | * | 3/1973 | Sterner | 384/38 |
| 4,304,540 A | | 12/1981 | Hammond | 425/150 |
| 4,637,738 A | * | 1/1987 | Barkley | 384/38 |
| 4,676,668 A | * | 6/1987 | Ide | 384/117 |
| 4,759,452 A | * | 7/1988 | Faint et al. | 212/350 |
| 4,874,309 A | | 10/1989 | Kushibe et al. | 425/589 |
| 4,941,758 A | * | 7/1990 | Osawa | 384/40 |
| 5,135,385 A | | 8/1992 | Fukuszawa et al. | 425/595 |
| 5,137,443 A | | 8/1992 | Munoz et al. | 425/522 |
| 5,176,454 A | * | 1/1993 | Schlereth | 384/45 |
| 5,238,394 A | | 8/1993 | Hirata | 425/590 |
| 5,275,550 A | | 1/1994 | Romi | 425/589 |
| 5,560,713 A | | 10/1996 | Christenson | 384/42 |
| 5,624,695 A | | 4/1997 | Glaesener et al. | 425/589 |
| 5,735,610 A | * | 4/1998 | Mark et al. | 384/42 |
| 5,785,486 A | | 7/1998 | McNeilus et al. | 414/513 |

(Continued)

OTHER PUBLICATIONS

Merriam-Webster's Collegiate Dictionary, tenth edition, p. 128, 1997.*

*Primary Examiner*—William C Joyce
(74) *Attorney, Agent, or Firm*—Katten Muchin Rosenman LLP (57) ABSTRACT

A flexible shoe assembly for use in a molding system. The clamp unit of a molding system includes a moving platen and a stationary platen supported by a frame. Tie bars interconnect the moving platen with the stationary platen. The tie bars are secured to the stationary platen and pass through respective openings in the moving platen. Each tie bar is supported and guided within their respective openings by a flexible shoe assembly and wear pad. The flexible shoe assembly has a force redirector for directing force away from a peripheral edge of the wear pad towards a central force area. The flexible shoe assembly also includes a load distributor to distribute the load across the wear pad surface. The flexible shoe assembly includes an upper support that is flexible about a lower support to keep the wear pad in operational contact with the tie bar.

1 Claim, 8 Drawing Sheets

U.S. PATENT DOCUMENTS

| | | | |
|---|---|---|---|
| 5,885,458 A | 3/1999 | Wilcher et al. | 210/525 |
| 6,170,989 B1 * | 1/2001 | Zeidan | 384/117 |
| 6,379,046 B1 * | 4/2002 | Zeidan | 384/117 |
| 6,524,092 B1 * | 2/2003 | Ito et al. | 425/444 |

* cited by examiner

FLEXIBLE SHOE ASSEMBLY

This is a divisional of application Ser. No. 09/448,477, filed Nov. 24, 1999.

FIELD OF THE INVENTION

The present invention relates to industrial machines such as molding systems and more particularly, the invention relates to a dynamic shoe assembly for supporting and slideably guiding a horizontal tie bar member with a platen of a molding system.

BACKGROUND OF THE INVENTION

In the field of industrial machines having fixed and movable members, bushings, sleeves and shoe assemblies are well known and commonly used in industry.

U.S. Pat. No. 5,624,695 entitled Securing Assembly For Injection Molding Machines issued on Apr. 29, 1997 to Husky Injection Molding Systems Ltd. and discloses a platen securing assembly. A stationary platen and moving platen are interconnected through a plurality of tie bar members. The tie bar members are supported and guided by a guide shoe located between the tie bar members and moving platen. The guide shoe is a fixed solid block of material and includes an integral wearing surface.

U.S. Pat. No. 5,275,550 entitled Hydromechanic Mold Clamping Mechanism issued to Industries Romi S.A., Brazil on Jan. 4, 1994 and discloses a hydromechancial clamp for injection molding machines. Two fixed platens are interconnected by a plurality of tie bar members. A moving platen is located intermediate the fixed platens and the tie bar members pass through the moving platen. A fixed solid bushing is disposed between an opening in the moving platen and the cylindrical surface of the tie bar member. The fixed solid bushing runs the entire width of the moving platen.

U.S. Pat. No. 5,135,385 entitled Clamping System issued to Ube Industries Ltd., on Aug. 4, 1992 and discloses a clamping system. A fixed platen and moving platen are interconnected by a plurality of tie bar members. A fixed solid bushing is disposed between an opening in the moving platen and the cylindrical surface of the tie bar member. The fixed solid bushing runs the entire width of the moving platen.

U.S. Pat. No. 5,238,394 entitled Mold Clamping Apparatus For Molding Apparatus issued to Nissei Jushi Kogyo K.K. on Aug. 24, 1993 and discloses a clamping apparatus. A fixed platen and moving platen are interconnected by a plurality of tie bar members. A fixed solid bushing is disposed between an opening in the moving platen and the cylindrical surface of the tie bar member. The fixed solid bushing runs the entire width of the moving platen.

U.S. Pat. No. 4,874,309 entitled Die Clamping Apparatus issued to Mitsubishi Jukogyo Kabushiki on Oct. 17, 1989 and discloses a die clamp. A fixed platen and moving platen are interconnected by a plurality of tie bar members. The moving platen has a plurality of openings for passing each tie bar member through the moving platen without a bushing, wear pad, or shoe assembly. The tie bar member slides on a ram insert located in each opening of the moving platen.

U.S. Pat. No. 4,304,540 entitled Hydraulic Press issued on Dec. 8, 1981 to Carl K. Hammon and discloses a hydraulic press including a fixed solid wedge guide mechanism. The wedge guide mechanism includes a wedge shoe adjustably mounted on a movable platen. The wedge shoe carries a removable solid wear plate that slides along an elongated solid wear plate.

U.S. Pat. No. 5,137,443 entitled Apparatus For Forming Hollow Plastic Article issued on Aug. 11, 1992 to Husky Injection Molding Systems and discloses a blow molding machine. A pair of long fixed "T" shaped solid wear strips are attached on opposing sides of a pallet. The wear strips communicate with a pair of "T" shaped recesses in the channel track for reciprocal movement of the pallet with respect to the channel track.

U.S. Pat. No. 5,885,458 entitled Wear Strip Assembly For Use In A Waste Water Treatment Facility issued On Mar. 23, 1999 to United States Filter Corporation and discloses a wear strip assembly for use in a waste water treatment facility. Long rigid "C" shaped wear strips are secured to a concrete floor through a number of anchor plates. Rigid "L" shaped wear shoes are secured to a flight through a rectangular upright portion. The wear shoes include a rectangular horizontal surface in contact with the wear strips. The rectangular horizontal surface slides over the wear strip during reciprocal movement of the flight in a horizontal direction.

U.S. Pat. No. 5,785,486 entitled Replaceable Wear System issued on Jul. 28, 1998 to McNeilus Truck and Manufacturing Corporation and discloses a replaceable wear system for use in refuse packing or ejecting mechanism. In one arrangement, a long rigid wear pad is substantially rectangular in cross section and includes a lengthwise triangular recess formed in the bottom of the wear pad for sliding engagement on a complimentary triangular rail located on a frame. In another arrangement, a long rigid wear pad is substantially triangular in cross section with a surface formed on the hypotenuse for sliding engagement on a complimentary wear surface located on the frame. The wear pads are retained with the packing arm through recesses for holding the wear pads and plates for securing the ends of the wear pads with the packing arm. The wear pads slide over the wear surfaces during reciprocal movement of the packing ram in a horizontal direction.

U.S. Pat. No. 5,560,713 entitled Ejector Wear Shoe issued on Oct. 1, 1996 to McNeilus Truck and Manufacturing Corporation and discloses a replaceable wear shoe for use on the ejection or packing mechanisms of a refuse hauling truck. A long rigid wear shoe is "C" shaped in cross section forming an inner channel. A rigid "T" shaped (cross section) slide bar communicates with the inner channel allowing smooth operation. The wear shoe slides over the slide bar during reciprocal movement of the receptacle.

The prior art devices are prone to several deficiencies and problems. For example, the fixed solid guide shoe of U.S. Pat. No. 5,624,695 has high compression loads at a peripheral edge of the wearing surface resulting in excessive wear and relatively early failure due to uneven loads.

The fixed solid bushings of U.S. Pat. Nos. 5,275,550 and 5,135,385 and 5,238,394 require tight machining tolerances to press fit the bushing into the opening in the moving platen and to receive the cylindrical tie bar member. Alignment is critical and any misalignment of this device may cause early bushing failure. Replacement of the device requires considerable time and equipment.

The prior art devices are static and cannot compensate for differing loads, non-uniform loads, bending moments, and stress profiles over the wearing surface. They are relatively expensive. Assembly of the machine and wear pads requires considerable time for lateral and longitudinal alignment of the components. The components tend to be long for maintaining alignment.

Early or frequent failure of wear pads leads to maintenance problems and is undesirable for machine down time and associated costs to disassemble the machine, replace the components, and re-assemble the machine.

Therefore, it is desirable to provide a shoe assembly and wearing surface which overcomes the aforedescribed problems of the prior art devices. There is a need for improving the wear characteristics of a wearing surface extending the useful life of a wear pad.

SUMMARY OF THE INVENTION

There is a need for reducing early or frequent failure of wear pads and a need for operational dynamic alignment of a wear pad in a flexible shoe assembly.

In accordance with a primary broad aspect of the present invention, there is provided a flexible shoe assembly for use in an injection molding system. The flexible shoe assembly comprises a body for supporting a load and a force redirector.

The body has an upper surface for slideably engaging a complimentary surface of a supported member. The force redirector is disposed in the body in a plane below the upper surface for redirecting the force from a peripheral edge of the upper surface to a central force area in the body.

The shoe assembly further comprises a load distributor disposed in a plane above the force redirector. The load distributor distributes the load across the upper surface and maintains the upper surface relatively flat under loading.

In the preferred embodiment, the load distributor is formed on the upper surface.

The shoe assembly further comprises a wear pad and a wear pad retainer. The wear pad retainer is formed in the upper surface of the body. The wear pad is mounted by the wear pad retainer on the upper surface. In an embodiment, the load distributor is formed on a lower surface of the wear pad.

In the preferred embodiment, the load distributor is a series of stepped notches. In an embodiment, the load distributor is a contoured recess.

The force redirector provides pivotal movement of the upper surface. In the preferred embodiment, the force redirector is a pair of slots in the body forming a web interconnecting the upper support member and the lower support member. In an embodiment of the invention, the force redirector is a slot forming a web interconnecting the upper support member and the lower support member.

The shoe assembly further comprises a first flexation stop disposed in one slot of the pair of slots between the upper support member and the lower support member. A second flexation stop is disposed in a second slot of the pair of slots between the upper support member and the lower support member. The first and second flexation stops limit pivotal movement of the upper support.

In the preferred embodiment, the wear pad retainer is a first edge lip formed at a first peripheral edge of the upper surface of the body and a second edge lip formed at a second peripheral edge of the upper surface of the body. The first edge lip and the second edge lip engage respective ends of the wear pad releasably retaining the wear pad with the shoe.

In accordance with a second broad aspect of the present invention, there is provided a molding system. The molding system comprises a stationary platen for mounting a first mold half. A moving platen for mounting a second mold half. At least one tie bar member interconnecting the moving platen and the stationary platen. The moving platen having at least one opening for receiving at least one tie bar member. A flexible shoe assembly mounted in the moving platen supporting the tie bar member. The flexible shoe assembly having a body for supporting a load. The flexible shoe assembly having a force redirector. The flexible shoe assembly having an upper surface for slideably engaging a complimentary surface of the tie bar member. The force redirector disposed in the body in a plane below the upper surface for redirecting the force from a peripheral edge of the upper surface to a central force area in the body.

The molding system further comprising an injection unit communicating with the first mold half for injection a molten material in the mold.

The molding system further comprising a first mold half and a second mold half. The first mold half mounted on the stationary platen. The second mold half mounted on the moving platen. The first mold half and the second mold half forming a mold including a core and cavity to define a part.

The present invention finds particular advantage in reducing localized wear and failure of a wear surface through force redirection and load distribution across the wear surface.

The present invention also finds advantage in extending the life of wear pads by reducing the wear and early failure of the wear pad. By extending the life of wear pads, another advantage is found in reducing the maintenance cost and machine down time.

The present invention also finds advantage in relatively improving the performance of a shoe assembly and wear pad by dynamically adjusting the mating surface of the wear pad to the complimentary surface of the supported member. Peak loads at the peripheral edge that lead to excessive wear, friction, and heat are reduced.

The present invention also finds advantage in providing dynamic operational adjustment of a wear surface by redirecting force and distributing stress in actual operation.

The present invention also finds advantage in ease of installation and initial alignment.

The present invention also finds advantage in lowering the cost of maintenance.

BRIEF DESCRIPTION OF THE DRAWINGS

For a better understanding of the nature and objects of the present invention reference may be had to the accompanying diagrammatic drawings in which.

DETAILED DESCRIPTION OF THE PREFERRED EMBODIMENT

Figure 1:
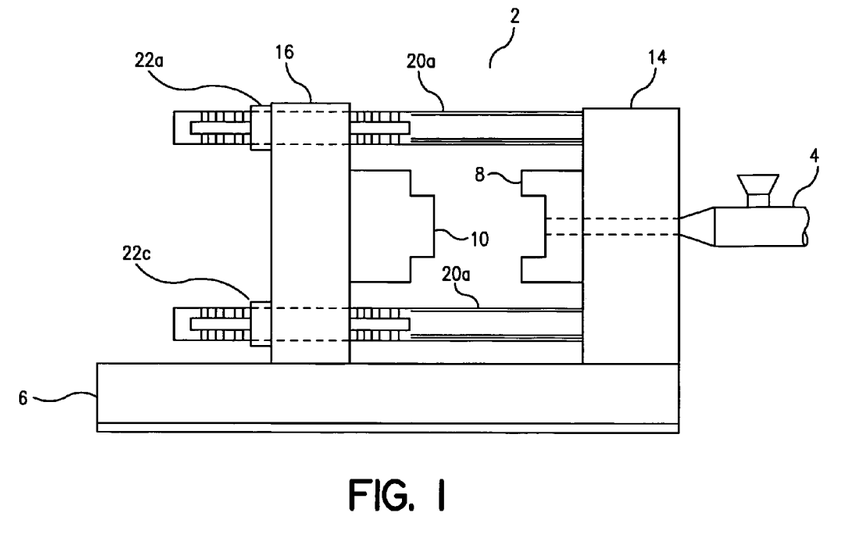
FIG. 1 is a simplified plan view of a molding system.

An embodiment of the present invention is described with initial reference to FIG. 1. The molding system includes a clamp unit 2 supported by a base 6 and an injection unit 4. The injection unit 4 provides for injecting a molten material, for example plastic, into a mold. Alternatively, the injection unit 4 provides for injecting a molten metal, for example a metal in a thixotropic state, into the mold. The injection unit 4 may also be omitted, for example with a blow mold system wherein a preform is introduced into a mold for subsequent shaping into a bottle.

The clamp unit includes a stationary platen 14 and a moving platen 16. Alternatively, the clamp unit may include more than one moving platen 16 in the case of a tandem machine. The moving platen 16 is movable quickly along the base 6 by a conventional mold stroke generator (not shown). The mold stroke generator may be hydraulic, electric, or a mechanical device to effectively open and close the mold.

The stationary platen 14 and moving platen 16 are interconnected by four tie bar members 20a, 20b, 20c, and 20d. (20a and 20c shown). Each tie bar member (20a-20d) is secured to the stationary platen by conventional means and permitted to slide axially through respective bores in the moving platen 16. Alternatively, each tie bar member (20a-20d) may be secured to the moving platen by conventional means and permitted to side axially through the stationary platen.

The moving platen 16 may be locked and unlocked to each tie bar member (20a-20d) through respective tie bar member locks 22a, 22b, 22c, and 22d (22a and 22c shown). When the moving platen 16 is locked to each of the four tie bar members (20a-20d), a clamp force generator supplies a clamp force to the mold. When the moving platen 16 is unlocked from each of the four tie bar members (20a-20d), the clamp force generator does not supply a clamp force to the mold. The clamp force generator may be hydraulic, electric, or a mechanical device to supply the required clamp force. The clamp force generator may be a separate actuator or integral with the tie bar member locks. When the moving platen 16 is unlocked, the moving platen 16 may be axially moved by the mold stroke generator.

The moving platen 16 is guided on the base. The tie bar members (20a-20d) are guided and aligned between the stationary platen 14 and the moving platen 16 by shoe assemblies (see FIG. 4). The tie bar members transmit the clamping force between the stationary platen 14 and the moving platen 16 during clamp up by the clamp force generator.

A first mold half 8 is secured to the stationary platen 14 and a second mold half 10 is secured to the moving platen 16. The first mold half 8 is a cavity and the second mold half 10 is a core. Alternatively, the first mold half 8 is a core and the second mold half 10 is a cavity. The first mold half 8 communicates with a channel formed in the stationary platen 14 to receive the molten material from the injection unit 4. The first mold half 8 and the second mold half 10 form a mold for defining a part.

Figure 2:
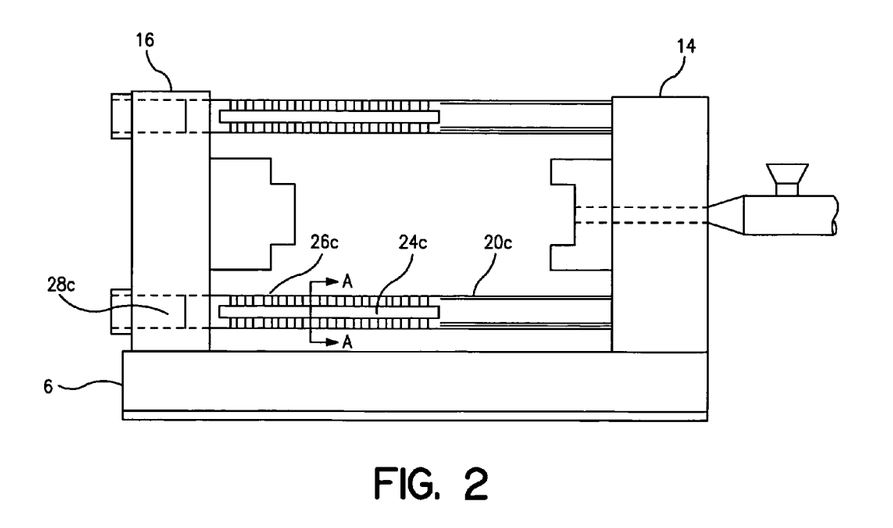
FIG. 2 is a simplified plan view of a molding system illustrating the movable platen extended to the maximum daylight position.

Referring now to FIG. 2, the molding system is shown illustrating the movable platen extended to a distant end of the tie bar members (20a-20d). Each of the four tie bar members are identical. The tie bar member 20a is essentially a straight cylindrical cantilever beam having a uniform load due to gravity distributed along the length of the beam. A plurality of teeth 26c are formed intermediate and near a distant end of the tie bar member 20c for engaging complimentary teeth in the tie bar member lock 22c. The teeth in the tie bar member lock 22c may be rotated into locking engagement and rotated into unlocking engagement with the teeth 26c. In locking engagement, a clamp force generator acting with the tie bar member locks provides a clamping force. Four tie bar member slots (24a-24d) are formed in the distant end of the tie bar member 20c. The teeth in the tie bar member lock 22a are rotated into the slot (24a-24d) area when unlocked permitting axial movement of the moving platen 16. The near end of a tie bar member 20c is fixed in the stationary platen 14. The distant end of the tie bar member 20c is supported by a shoe assembly (see FIG. 15) located in the bore 28c of the moving platen 16.

Figure 3:
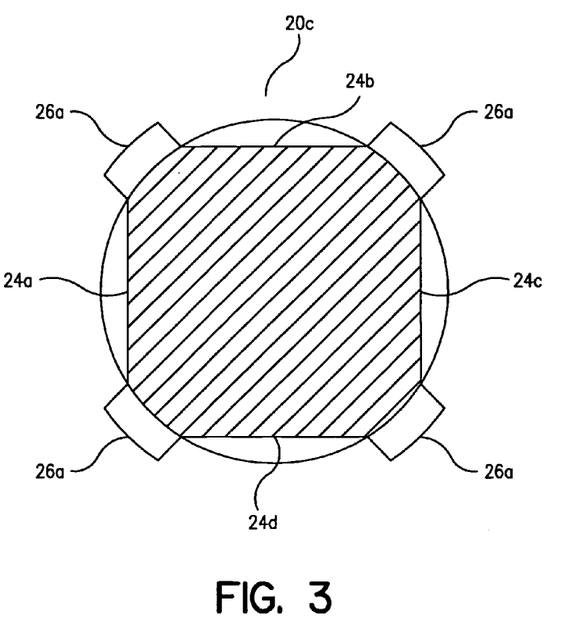
FIG. 3 is sectional view of a tie bar member taken along line A-A of FIG. 2.

Referring now to FIG. 3, a cross sectional view of the tie bar member 20c is shown. The tie bar member 20c is substantially cylindrical. Multiple sets of four teeth 26a extend outwardly from the tie bar member 20c. Each set of four teeth 26a provide locking engagement with complimentary teeth in the tie bar member lock 22c (not shown) to effectively lock the moving platen 16 (not shown) on the tie bar member 20c.

The tie bar member 20c includes a substantially square inner section formed by four tie bar slots machined into the outer surface of the tie bar member 20c. The tie bar slots provides a sliding surface to engage a wear pad. The substantially square inner section includes a top lengthwise slot 24b, a right lengthwise slot 24c, a bottom lengthwise slot 24d, and a left lengthwise slot 24a. The complimentary teeth in the tie bar member lock 22a (not shown) pass over the tie bar slots (24a-24d) unrestricted in the unlocked position permitting the moving platen to pass over the tie bar member 20c.

Alternatively, the number of teeth per set and corresponding tie bar slots may be more or less than four, for example 3, 6, 9 or 12.

Figure 4:
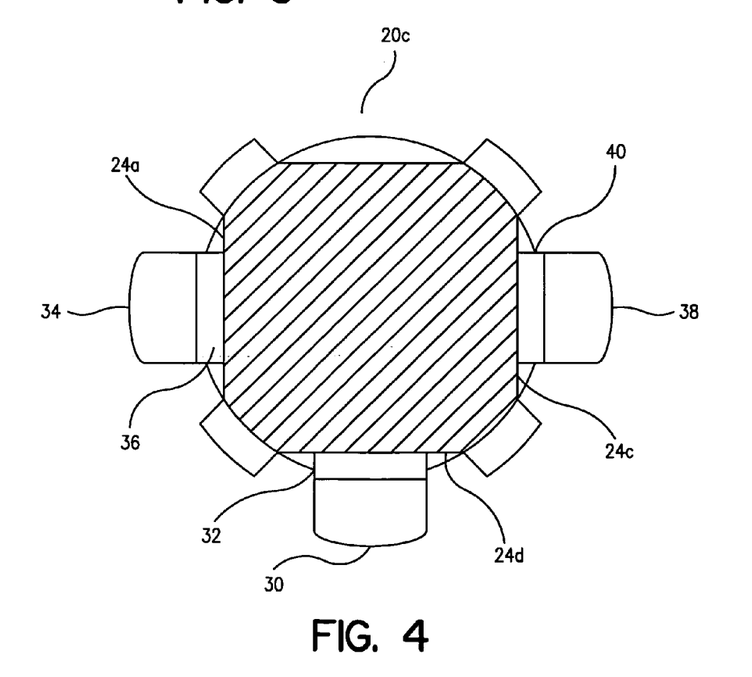
FIG. 4 is a sectional view of a tie bar member taken along line A-A of FIG. 2 illustrating three shoe assemblies in relationship to a single tie bar member.

Referring now to FIG. 4, a cross sectional view of the tie bar member 20c is shown in relationship to a plurality of shoe assemblies. A left shoe assembly 34 is mounted by conventional means to an inner surface of an opening in the moving platen 16 (not shown). A left wear pad 36 is mounted on the left shoe assembly 34 for sliding engagement with the left lengthwise slot 24a.

A right shoe assembly 38 is mounted by conventional means to the inner surface of an opening in the moving platen 16 (not shown). A right wear pad 40 is mounted on the right shoe assembly 38 for sliding engagement with the right lengthwise slot 24c.

The combination of the left shoe assembly 34 and left wear pad 36, and the right shoe assembly 38 and right wear pad 40 prevent lateral movement of the tie bar member 20a with respect to the moving platen 16 (not shown).

Figure 15:
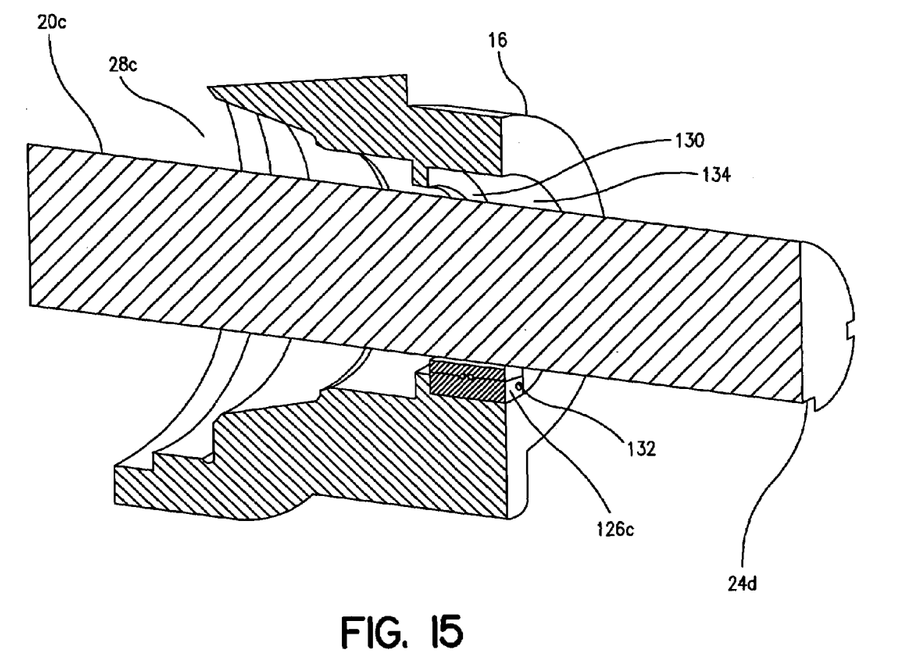
FIG. 15 is a cross sectional view taken along line B-B of FIG. 12 showing placement of a bottom shoe assembly within the platen and engagement with the tie bar member.

A bottom shoe assembly 30 is mounted by conventional means to the inner surface of an opening in the moving platen 16 (see FIG. 15). A bottom wear pad 32 is mounted on the bottom shoe assembly 30 for sliding engagement with the bottom lengthwise slot 24d of the tie bar member 20c. The bottom shoe assembly 30 and wear pad 32 also support the tie bar member 20c from the moving platen 16 (not shown).

Figure 5:
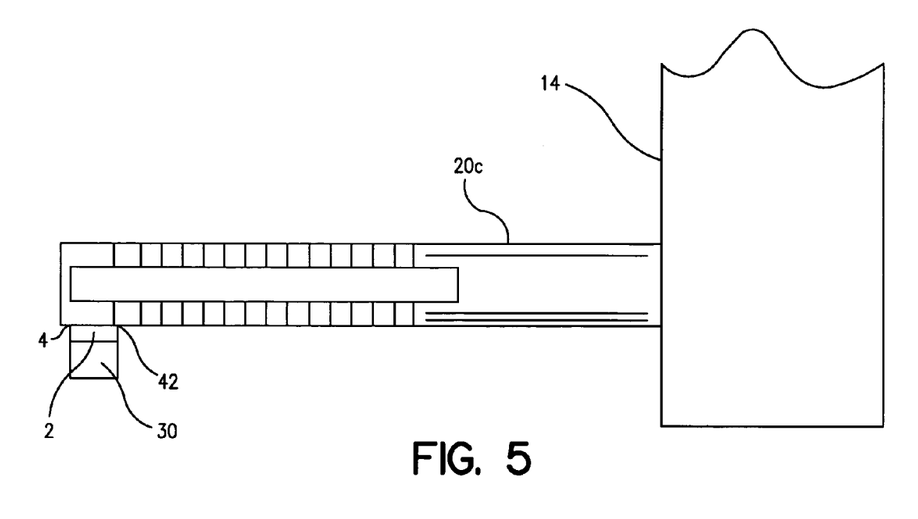
FIG. 5 is a partial plan view of a tie bar member illustrating the fixed end secured to the stationary platen and a movable shoe assembly located at a distant end of the tie bar member.
Figure 6:
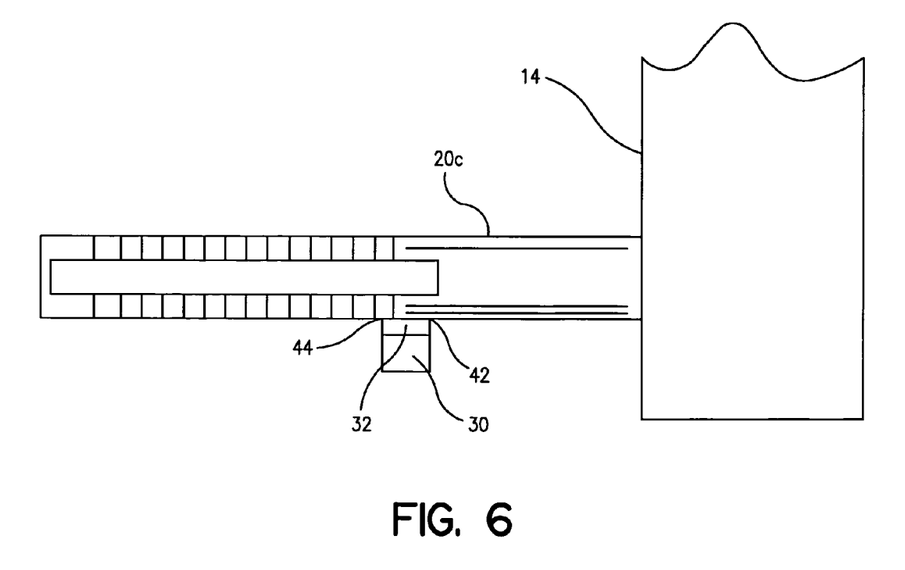
FIG. 6 is a partial plan view of a tie bar member illustrating the fixed end secured to the stationary platen and the movable shoe assembly located intermediate the ends of the tie bar member.

Referring now to FIG. 5 and FIG. 6, a tie bar member 20c is shown with a bottom shoe assembly 30 located at the distant end of the tie bar member 20c in a maximum daylight position and intermediate the two ends of the tie bar member 20c in a minimum shut height position. These extreme positions of the shoe assembly 30 are not related to the locking teeth as the tie bar slots in the tie bar members 20c extend beyond the locking teeth.

The tie bar member 20c is fixed to the stationary platen 14 and supported by the bottom shoe assembly 30 and bottom wear pad 32. The tie bar member 20c tends to bend under uniform load of the tie bar member 20c. The shoe assembly 30 is relatively short with respect to the overall length of the tie bar member 20c which concentrates a relatively large force over the shoe assembly.

When the bottom shoe assembly 30 and bottom wear pad 32 are located at the distant end of the tie bar member 20c at the maximum day light position, the leading edge 42 of the bottom wear pad 32 is subjected to higher stress than the trailing edge 44 due to the bending of the tie bar member 20c. In this configuration, the distant end of the tie bar member 20c tends to deflect away from the trailing edge 44 of the bottom wear pad 32 concentrating the force on a smaller area near the leading edge 44 of the bottom wear pad 32.

When the bottom shoe assembly 30 and bottom wear pad 32 are located intermediate the two ends of the tie bar member 20c at the minimum shut height position, the trailing edge 44 of the bottom wear pad 32 is subjected to higher stress than the leading edge 42 due to a different bending profile of the tie bar member 20c. In this configuration, the distant end of the tie bar member 20c tends to deflect downward concentrating the force on a smaller area near the trailing edge 44 of the bottom wear pad 32.

The shoe assembly 30 dynamically adjusts to the tie bar member 20c over the entire range of the moving platen between the maximum day light position and the minimum shut height position keeping the entire surface of the wear pad in contact with the surface of the tie bar slot.

Figure 7:
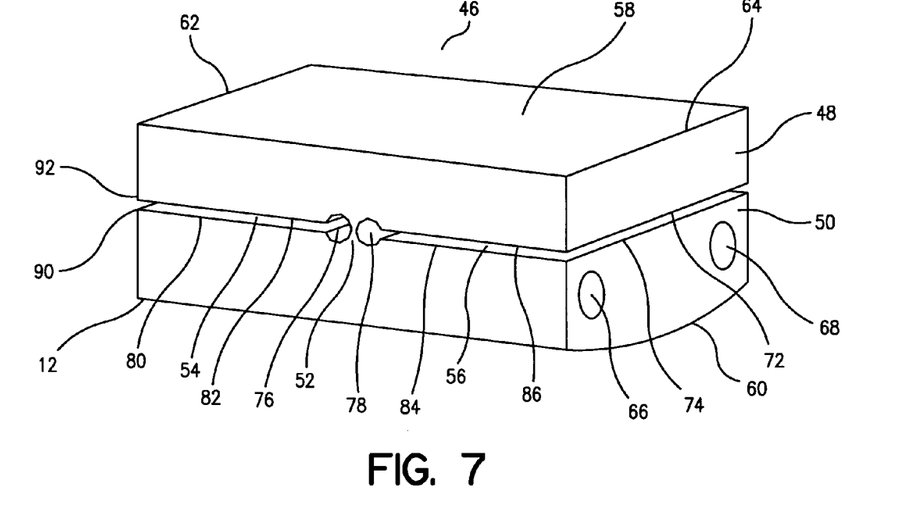
FIG. 7 is a perspective view of a shoe assembly having an force redirector and integral wear surface.

Referring now to FIG. 7, a embodiment of the present invention is shown as 46. The shoe assembly body 12 is a substantially rectangular block. The body 12 is longer about the longitudinal axis than the lateral axis. A shoe assembly body 12 has an upper surface 58 for slideably supporting a tie bar member (not shown). The upper surface 58 contains an integral wearing surface.

The shoe assembly body 12 has a first slot 54 extending from an side outer edge of the body 12 inwardly towards a central web 52. A second slot 56 extends from an opposite side edge of the body 12 inwardly towards the central web 52. The first slot 54 and the second slot 56 are coplanar and equal in length and height. A first stress relieving bore 76 is disposed at an end of the first slot 54 near the web 52 and a second stress relieving bore 78 is disposed at an end of the second slot 56 near the web 52 on the other side.

The stress relieving bores (76 and 78) extend the entire width of the slots (54 and 56). The body 12 is substantially "I" shaped in cross section about the lateral axis.

The first slot 54 and the second slot 56 define a flexible upper support 48 and a lower support 50. The flexible upper support 48 and the lower support 50 are substantially rectangular. The upper support 48 and the lower support 50 are flexibly interconnected by the web 52. An intermediate plane defined by the first slot 54 and the second slot 56 is parallel to a top plane defined by the upper surface 58. A bottom plane is defined by the bottom surface 60 and is parallel to the intermediate and top planes. Alternatively, only one slot may be provided for provide one peripheral edge with the ability to flex and distribute the load. For this configuration, the body 12 is substantially "C" shaped in cross section about the vertical axis. Alternatively, the slots (54 and 56) extend outwardly from the central web 52 and upwardly towards the upper surface 58. Alternatively, the slots (54 and 56) extend outwardly from the central web 52 and downwardly towards a bottom surface 60. Alternatively, the web 52 is not central in the shoe assembly body 12. Alternatively, the slots are not equal in length.

A first peripheral edge 62 of the upper support 48 is dynamically vertically flexible. The second peripheral edge 64 of the upper support 48 is also dynamically vertically flexible. The vertical flexibility of these edges (62 and 64) is for uneven surface contact with a corresponding slot of a tie bar member. The edges (62 and 64) may flex independently of each other to distribute an applied load about the upper surface 58. The height of the slot 56 and web 52 are such to permit unrestricted operational flexibility of the upper support 48.

Alternatively, the upper surface 58 may pivot about the central web 52. The pivoting is for maintaining operational surface contact and alignment with a slot in a tie bar member during bending of the tie bar member.

The web 52 is relatively thin about the vertical axis to the relatively thick upper support 48 and lower support 50. The web 52 provides elastic deformation as the upper support 48 pivots.

The vertical flexibility of the edges (62 and 64) and the pivoting of the upper support 48 are much less than the height of the slots (54 and 56).

A force redirector for directing force away from a peripheral edges (62 and 64) towards a central force area is formed by the upper support 58 and the web 52. The central force area is directly over the web 52. The force redirector is disposed intermediate the upper support 48 and the lower support 50. The force redirector is equidistant from the upper surface 58 and the bottom surface 60. Alternatively, the force redirector may be formed closer to the upper surface 58, or closer the bottom surface 60.

The first slot 54 defines a first intermediate upper support surface 82, a first upper support edge 92, a first intermediate lower support surface 80, and a first lower support edge 90.

The height of the first slot 54 may be varied to limit the amount of vertical deflection. Vertical deflection of the first peripheral edge 62 is limited by the height of the first slot 54 and contact between the first upper support edge 92 and the second lower support edge 90. The height of the first slot 54, first upper support edge 92, and first lower support edge 90 form a first flexation stop 96. The first flexation stop 96 prevents plastic deformation of web 52 of the shoe assembly.

The second slot 56 defines second intermediate upper support surface 86, a second upper support edge 72, a second intermediate lower support surface 84, and a second lower support edge 74.

The height of the second slot 56 may be varied to limit the amount of vertical deflection. Vertical deflection of the second peripheral edge 64 is limited by the height of the second slot 56 and contact between the second upper support edge 72 and the second lower support edge 74. The height of the second slot 56, second upper support edge 72, and second lower support edge 74 form a second flexation stop 70. The second flexation stop 70 prevents plastic deformation of the web 52 of the shoe assembly. The web 52 effectively interconnects the second intermediate surfaces (82 and 86) with the first intermediate surfaces (80 and 84).

The height of the first slot 54 and the height of the second slot 56 are equal for providing the same maximum amount of flexation for the first peripheral edge 62 and the second peripheral edge 64. Alternatively, the heights of the slots (54 and 56) may be different providing different maximum amounts of flexation for the first peripheral edge 62 and the second peripheral edge 64.

The bottom surface 60 is semi cylindrical for mounting adjustment with the surface of a bore in a platen (not shown). A first fixation bore 66 and a second fixation bore 68 extend lengthwise through the lower support 50 of the shoe body assembly 12. Fasteners extend through each bore (66 and 68) to positively retain the shoe assembly body 12 in a platen.

Figure 8:
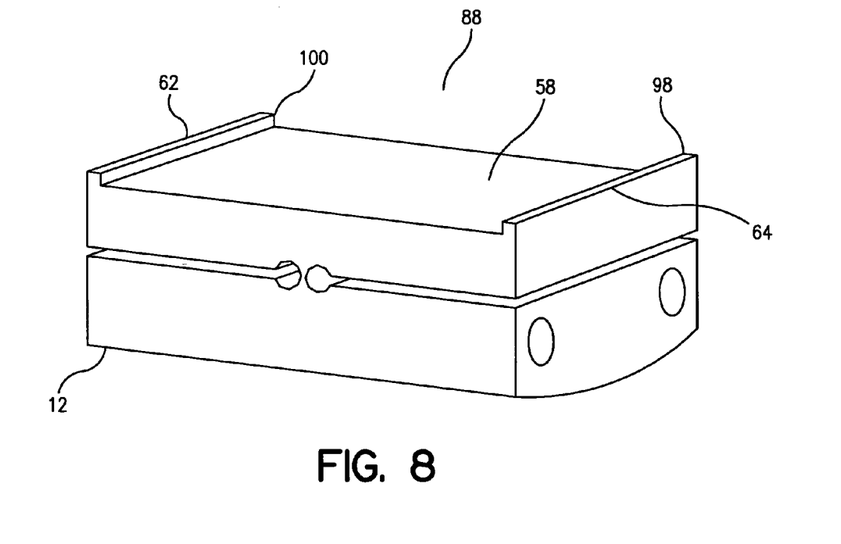
FIG. 8 is a perspective view of a shoe assembly having a force redirector and wear pad retainer.

Referring now to FIG. 8, another embodiment of the present invention is shown generally as 88. A first edge lip 98 is formed at the first peripheral edge 64 of the shoe assembly body 12. A second edge lip 100 is formed at the second peripheral edge 62 of the shoe assembly. The lips (98 and 100) are disposed opposite each other and extend outwardly from the upper surface 58 of the shoe assembly body 12. An inner surface of the first edge lip 98 and an inner surface of the second edge lip 100 engage complimentary surfaces (see FIG. 10, first side 118 and second side 120) of a wear pad 94 (FIG. 10) for releasably retaining the wear pad 94 with the shoe assembly body 12. The height of the lips (98 and 100) are such to retain the wear pad without obstructing the wear surface 110 of the wear pad 94. The width of the lips (98 and 100) are such to retain the wear pad 106 with the shoe assembly body 12 in operation of the system. The first edge lip 98, the second edge lip 100, and the upper surface 58 of the shoe assembly body 12 form a wear pad retainer formed on the upper surface 58 of the shoe assembly body 12. Alternately, the wear pad may be retained with the shoe through conventional fasteners.

The wear pad may be centered on the surface 58 of the shoe assembly by a pin or key or groove through a complimentary mating surface.

Figure 9:
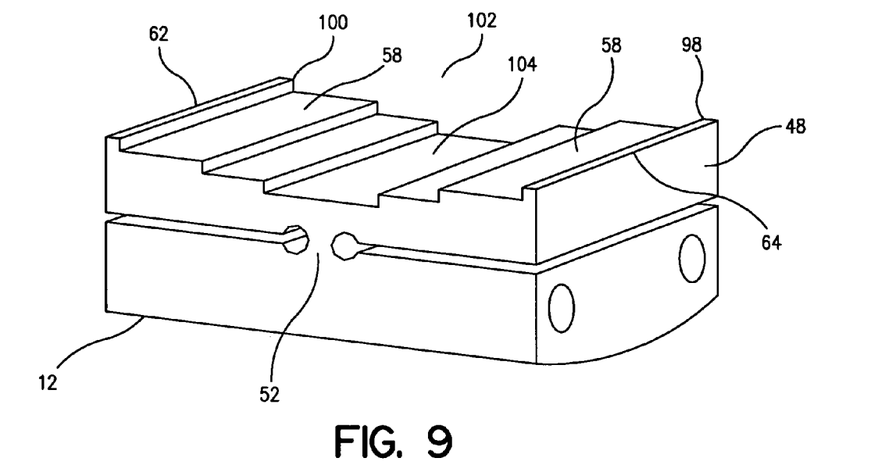
FIG. 9 is a perspective view of a shoe assembly having a force redirector, a load distributor, and a wear pad retainer.

Referring now to FIG. 9, the another embodiment of the shoe assembly is generally shown as 102. This embodiment includes the features previously described with respect to FIGS. 7 and 8. A load distributor 104 is formed in the upper surface 58 of the shoe assembly body 12. A series of steps or notches are formed intermediate the first and second peripheral edge of the shoe assembly body 12. The steps extend downwardly into the upper support 48 and are disposed lengthwise about the surface 58. Alternatively, the load distributor may be a smoothly contoured surface.

Those skilled in the art will appreciate that the steps shown in the figure are exaggerated. In an embodiment of the invention, the actual height of each step is in the range of 0.05 mm and the steps are machined into the upper surface 58 of the shoe assembly body 12.

The load distributor 104 compensates for the deflection of the upper section 48 of the shoe assembly 12 under loading conditions. The contoured surface of the load distributor creates a substantially flat surface when the upper member 48 bends under the load from a tie bar member. The number and location of each step is such to proved the substantially flat upper surface 58 during bending.

Figure 10:
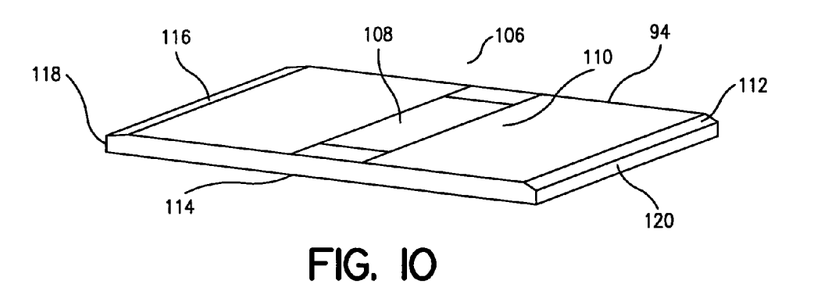
FIG. 10 is a perspective view of a wear pad.

Referring now to FIG. 10, a preferred embodiment of a wear pad 94 is shown generally as 102. The wear pad 94 is substantially rectangular having a wear surface 110, a bottom surface 114, a first side 118 and a second side 120. The wear pad 94 is of suitable thickness, length, and width for supporting a load. The bottom surface 114 is supported by the upper surface 58 of the shoe assembly body 12. A first chamfer 116 is disposed on the wear surface 110 near the first side 118. A second chamfer 112 is disposed on the wear surface 110 near the second side 120. The chamfers (116 and 112) ease engagement for reciprocal movement in a horizontal direction with a tie bar member (not shown).

Optionally, lubrication grooves 108 may be formed in the upper wearing surface 110 of the wear pad 94 including an optional through hole for supplying a lubricant.

Figure 11:
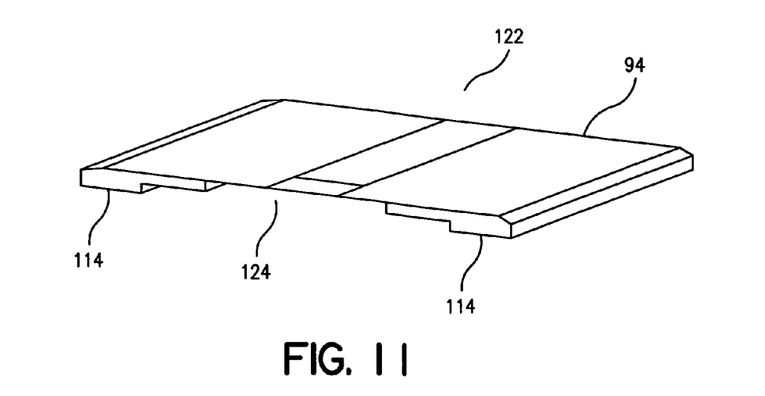
FIG. 11 is a perspective view of a wear pad having a load redirector.

Referring now to FIG. 11, a second embodiment of the wear pad 94 is shown generally as 122. Alternatively, a load distributor 124 as previously described with reference to FIG. 9 may be formed in the bottom surface 114 of the wear pad 94 for equally distributing the load across the length of the wear pad 94. Those skilled in the art will appreciate that the steps shown in the load distributor 124 are exaggerated to illustrate the overall contour.

Figure 12:
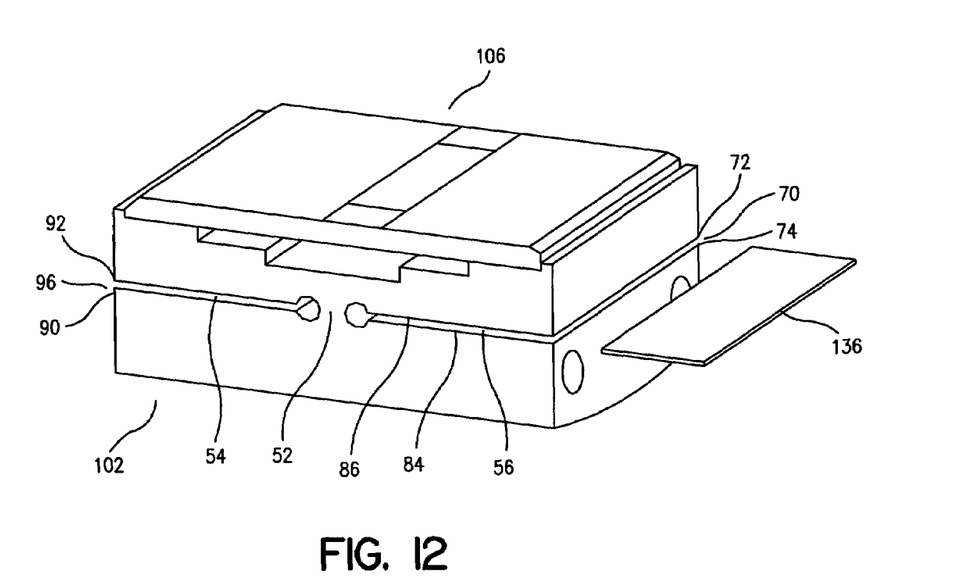
FIG. 12 is a perspective view of a shoe assembly having a force redirector, a load distributor, a wear pad retainer, a wear pad, and a stop shim.
Figure 13:
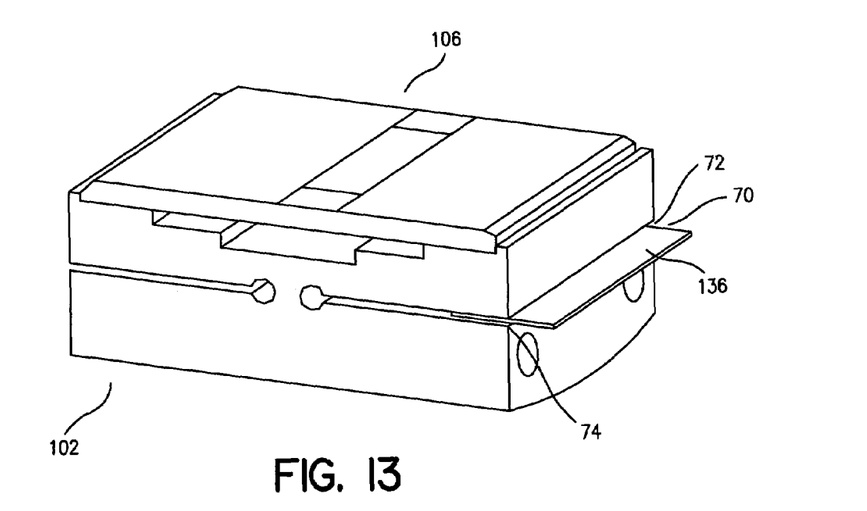
FIG. 13 is a perspective view of a shoe assembly having a force redirector, a load distributor, a wear pad retainer, a wear pad, and a stop shim inserted into one end of the force redirector.

Referring now to FIGS. 12 and 13, the preferred embodiment of the present invention is illustrated. The preferred embodiment includes the shoe assembly 102 of FIG. 9 in combination with the wear pad 106 of FIG. 10.

A stop shim 136 prevents plastic deformation of the web 52 during installation of the shoe assembly between a moving platen and a tie bar member. The height of the slot 56 is larger than the thickness of the stop shim 136. The stop shim 136 may be inserted into the slot 56 limiting the vertical movement of the first upper support edge 72 with respect to the first lower support edge. The limit of vertical movement is defined by thickness of the stop shim 136. The first upper support edge 72 and first lower support edge 74 effectively close upon the stop shim 136.

The stop shim 136 may also be inserted into the slot 54 limiting the vertical movement of the second upper support edge 92 with respect to the second lower support edge 90. Again the height of the slot 54 is larger than the thickness of the stop shim 136. After installation of a shoe assembly, the stop shim 136 is removed from the slot.

The stop shim 136 may also be used during side entry of a mold. The stop shim 136 is inserted into the slot, then a tie bar member may be de-secured from the stationary platen and pulled back through the stationary platen. As the tie bar member is pulled back, the stop shim 136 limits movement and prevents plastic deformation of the web 53. Once the tie bar member is clear of the mold area, the mold may be mounted in the machine. Then the tie bar member is re-assembled between the stationary platen and moving platen. As the tie bar member engages the wear pad 106 of the shoe assembly, the first support edge 72 vertically deflects downwardly, resting on the stop shim 136. The stop shim 136 is removed at the end of the operation.

Figure 14:
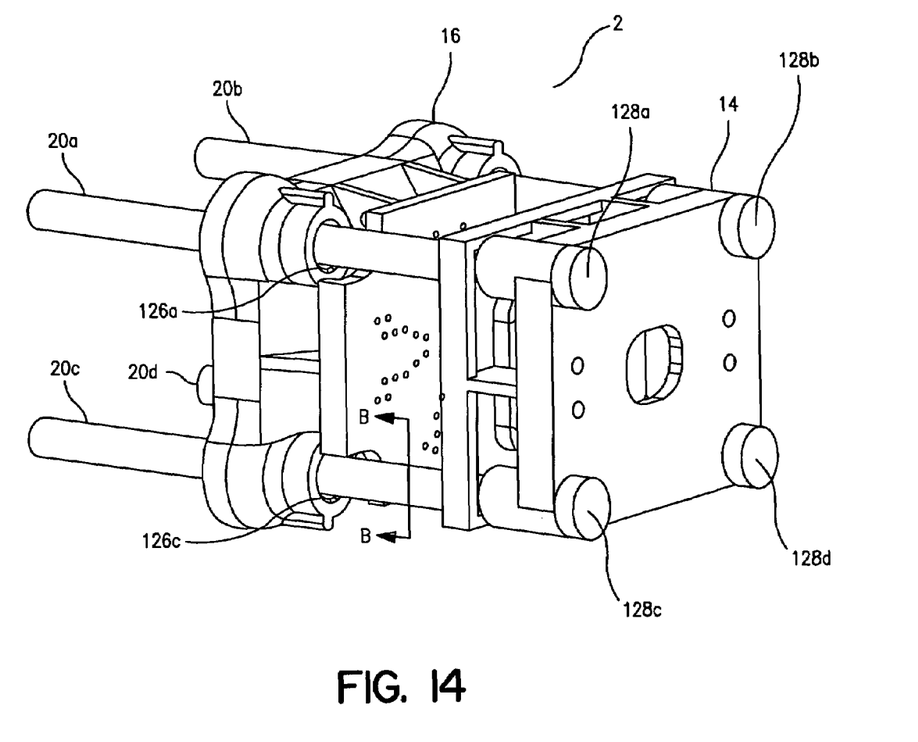
FIG. 14 is a perspective view of a clamp unit showing a fixed platen interconnected by tie bar members to a moving platen and placement of a bottom shoe assembly.

Referring now to FIG. 14, a pair of bottom shoe assemblies are shown mounted within a moving platen. The stationary platen 14 is interconnected to the moving platen 16 through four tie bar members (20a, 20b, 20c, and 20d). Each tie bar member is fixed to the stationary platen 14 by conventional securing (128a, 128b, 128c, and 128d). The moving platen 16 may be reciprocated between a maximum daylight position and a minimum shut height position about the stationary platen 14. Each of the four tie bar members (20a, 20b, 20c, and 20d) pass through respective bores in the moving platen 16. A first bottom shoe assembly 126a is disposed in a bore of the moving platen and slideably engages a surface of the tie bar member 20a. A second bottom shoe assembly 126c is disposed in a bore of the moving platen and slideably engages a surface of the tie bar member 20c. A third and forth shoe assembly (not shown) are disposed in respective bores and slideably engage respective surfaces of tie bar member 20b and tie bar member 20c.

Referring now to FIG. 15, a cross sectional view of a bottom shoe assembly 126c is shown mounted in a bore 28c of the moving platen 16 engaging a bottom lengthwise slot 24c of a tie bar member 20c. The bore 28c of the moving platen 16 includes a inner cylindrical surface 134 and an annular ridge wall 130. A bottom surface 60 (see FIG. 7) of the bottom shoe assembly 126c engages and rests upon a portion of the complimentary cylindrical surface 134. A side of the bottom shoe assembly 126c engages a portion of the annular ridge wall 130. The annular ridge wall 130 includes a pair of threaded bores (not shown) to secure each shoe assembly in the bore of the moving platen. A pair of threaded fasteners 132 (one shown) pass through the respective fixations bores (66 and 68) of the shoe assembly for tightly securing each shoe assembly in the bore of the moving platen.

The tie bar member may not have perfect orientation during installation with the respective bore 28c causing the tie bar slots (24d shown) to be slightly offset by a few degrees of rotation either to the left or the right of center. The bore surface 134 is cylindrical and the bottom surface 60 (see FIG. 7) of the shoe assembly is a complimentary semi-cylindrical surface that provides positioning and adjustment of the shoe assembly, left or right of center, in the bore 28c during installation.

In an embodiment of the shoe assembly for a Husky E900 clamp unit, the wear pad size is 100 mm long by 51 mm wide by 8 mm thick and the shoe assembly was 110 mm long by 55 mm wide by 50 mm thick. In another embodiment of the show assembly for a Husky E8000 clamp unit, the wear pad size is 290 mm long by 142 mm wide by 8 mm thick and the shoe assembly was 300 mm long by 150 mm wide by 75 mm high. Those skilled in the art understand the dimensions of the wear pad and shoe assembly depend on the unit load capacity, strength and flexibility requirements. The web dimensions are selected to support the load and allow elastic flexation of each peripheral edge.

In an embodiment, the shoe assembly is a integral steel block. Alternatively, the shoe assembly may be cast or a weldment of separate components.

The wear pad material must posses certain physical and chemical properties which permit it to operate properly (fatigue resistance, conformability, thermal conductivity, corrosion resistance, and load capacity). The wear pad surface is substantially flat and the surface of the tie bar slots are substantially flat. Alternatively, the wear pad surface and surface of the tie bar slots may be other complimentary shapes, for example concave or convex.

In an embodiment, the shoe assembly is retained by fixtures passing through the fixation bores. Alternatively, a housing or fixation plate may secure the shoe assembly.

In operation, the movable platen may be rapidly cycled between open and closed positions for stroking the mold. The movable platen may also move relatively slowly to clamp up. The upper support of the shoe assembly is flexible and pivots about the web keeping the surface of the wear pad in operational contact with the tie bar as the tie bar bends during movement of the platen between the maximum day light position and the minimum shut height position. The force redirector directs forces away from the peripheral edges of the wear pad to a central force area over the web during operation. The load distributor compensates for deflection of the upper support under load and maintains a relatively flat upper surface distributing the load over the entire surface.

It is to be understood by those skilled in the art that the present invention is not limited to the illustrations described and shown herein, which are deemed to be illustrative of an embodiment of the invention and may be modified without departing from the scope and spirit of the invention. The invention is intended to encompass all modifications, which are within its scope and spirit as defined by the attached claims.

We claim:

1. A molding system flexible shoe assembly, comprising:
   a body for supporting a load; and
   a force redirector;
   said body having an upper wearing surface configured to slideably engage a linearly moving complimentary surface of a supported member,
   said force redirector being disposed in said body in a plane below said upper wearing surface and substantially perpendicular to the linear movement of said body,
   said force redirector configured to redirect a linearly-moving force from a leading edge and a trailing edge of said upper wearing surface to a central area in said body,
   said body including at least one fixation bore extending lengthwise through a lower support of said body.

* * * * *